United States Patent
Zhang et al.

(10) Patent No.: US 11,305,873 B2
(45) Date of Patent: Apr. 19, 2022

(54) AIR, SEA AND UNDERWATER TILT TRI-ROTOR UAV CAPABLE OF PERFORMING VERTICAL TAKE-OFF AND LANDING

(71) Applicant: Dalian University of Technology, Liaoning (CN)

(72) Inventors: Shuo Zhang, Liaoning (CN); Zongyang Lv, Liaoning (CN); Tao Sun, Liaoning (CN); Yuhu Wu, Liaoning (CN); Ximing Sun, Liaoning (CN); Zhenyu Wu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 371 days.

(21) Appl. No.: 16/341,402

(22) PCT Filed: Oct. 23, 2017

(86) PCT No.: PCT/CN2017/107292
§ 371 (c)(1),
(2) Date: Apr. 11, 2019

(87) PCT Pub. No.: WO2019/079930
PCT Pub. Date: May 2, 2019

(65) Prior Publication Data
US 2020/0062386 A1 Feb. 27, 2020

(51) Int. Cl.
*B64C 37/00* (2006.01)
*B64C 35/00* (2006.01)
(Continued)

(52) U.S. Cl.
CPC .............. *B64C 35/002* (2013.01); *B63B 7/08* (2013.01); *B63B 35/00* (2013.01); *B63G 8/001* (2013.01);
(Continued)

(58) Field of Classification Search
CPC ......... B64C 25/54; B64C 25/56; B64C 27/22; B64C 27/26; B64C 27/28; B64C 27/52;
(Continued)

(56) References Cited

U.S. PATENT DOCUMENTS

| 1,286,679 | A | * | 12/1918 | Longobardi | .......... B60F 3/0007 244/2 |
| 1,421,369 | A | * | 7/1922 | Ardo | ..................... B64C 35/005 244/2 |

(Continued)

FOREIGN PATENT DOCUMENTS

| CN | 2695270 Y | 4/2005 |
| CN | 104608927 A | 5/2015 |

(Continued)

OTHER PUBLICATIONS

Carlson, Stephen. "A hybrid tricopter/flying-wing vtol uav." 52nd Aerospace Sciences Meeting. 2014. (Year: 2014).*

*Primary Examiner* — Richard R. Green
*Assistant Examiner* — Michael A. Fabula
(74) *Attorney, Agent, or Firm* — Muncy, Geissler, Olds & Lowe, P.C.

(57) ABSTRACT

An air, sea and underwater tilt tri-rotor UAV capable of performing vertical take-off and landing. By the method for controlling a submerged floating device and a tilt tri-rotor device, the UAV is switched among the vertical take-off and landing mode, fixed wing mode, water surface sailing mode and underwater submerging mode.

1 Claim, 5 Drawing Sheets

(51) Int. Cl.
*B63B 7/08* (2020.01)
*B63B 35/00* (2020.01)
*B63G 8/00* (2006.01)
*B64C 9/00* (2006.01)
*B64C 27/26* (2006.01)
*B64C 27/28* (2006.01)
*B64C 29/00* (2006.01)
*B64D 47/00* (2006.01)
*B64C 39/02* (2006.01)

(52) U.S. Cl.
CPC ............... *B64C 9/00* (2013.01); *B64C 27/26* (2013.01); *B64C 27/28* (2013.01); *B64C 29/0033* (2013.01); *B64D 47/00* (2013.01); *B63B 2035/006* (2013.01); *B63B 2207/04* (2013.01); *B63G 2008/002* (2013.01); *B64C 39/024* (2013.01); *B64C 2009/005* (2013.01); *B64C 2201/027* (2013.01); *B64D 2201/00* (2013.01)

(58) Field of Classification Search
CPC ..... B64C 35/00; B64C 35/001; B64C 35/002; B64C 35/008; B64C 37/00; B64C 39/00; B64C 2201/126; B60F 5/02
See application file for complete search history.

(56) References Cited

U.S. PATENT DOCUMENTS

| | | | | |
|---|---|---|---|---|
| 1,771,724 A * | 7/1930 | Perez | | B64C 35/00 244/50 |
| 1,780,298 A * | 11/1930 | Baptiste | | B64C 37/00 244/11 |
| 2,162,066 A * | 6/1939 | De Asis | | B64C 35/005 244/49 |
| 2,350,608 A * | 6/1944 | Griffith | | B64C 37/00 244/49 |
| 2,444,332 A * | 6/1948 | Briggs | | B64C 3/56 244/49 |
| 2,554,938 A * | 5/1951 | Catalano | | B60F 3/00 244/102 R |
| 2,563,731 A * | 8/1951 | Masterson | | B64C 37/00 244/2 |
| 2,707,084 A * | 4/1955 | Mills, Jr. | | B64C 37/00 244/50 |
| 3,029,042 A * | 4/1962 | Martin | | B60F 3/00 244/2 |
| 3,092,060 A * | 6/1963 | Reid | | B64C 37/00 114/313 |
| 3,261,572 A * | 7/1966 | Gorton | | B64C 37/00 244/2 |
| 3,481,559 A * | 12/1969 | Postelson | | B60F 3/00 244/2 |
| 4,579,297 A * | 4/1986 | Ayoola | | B60F 3/00 244/106 |
| 4,841,896 A * | 6/1989 | Fury | | B63G 8/001 114/121 |
| 4,865,275 A * | 9/1989 | Thompson | | B64C 3/48 244/219 |
| 4,899,954 A * | 2/1990 | Pruszenski, Jr. | | B60F 5/00 244/2 |
| 4,913,375 A * | 4/1990 | Fitzpatrick | | B64C 37/00 114/272 |
| 5,242,132 A * | 9/1993 | Wukowitz | | B64C 35/00 114/262 |
| 5,415,365 A * | 5/1995 | Ratliff | | B64C 35/00 114/271 |
| 6,592,073 B1 * | 7/2003 | Meekins | | B64C 11/001 244/105 |
| 7,063,291 B2 * | 6/2006 | Rado | | B64C 3/42 244/101 |
| 8,671,868 B2 * | 3/2014 | Shifferaw | | B63G 8/14 114/357 |
| 8,983,682 B1 | 3/2015 | Peeters et al. | | |
| 9,259,984 B2 * | 2/2016 | Brown | | B64C 39/04 |
| 9,452,843 B1 * | 9/2016 | Lu | | B64D 25/00 |
| 9,505,282 B2 * | 11/2016 | Hu | | B64D 27/04 |
| 9,580,172 B2 * | 2/2017 | Hobart | | B60F 5/006 |
| 10,399,673 B1 * | 9/2019 | Roop | | B64C 29/0033 |
| 2002/0139894 A1 | 10/2002 | Sorensen | | B60V 1/08 244/2 |
| 2003/0173454 A1 * | 9/2003 | Brown | | B64C 35/008 244/2 |
| 2005/0247819 A1 * | 11/2005 | Caruso | | B64C 31/036 244/2 |
| 2006/0145000 A1 * | 7/2006 | Hensley | | B64C 35/008 244/106 |
| 2006/0284010 A1 * | 12/2006 | Meekins | | B64C 35/008 244/105 |
| 2009/0121071 A1 * | 5/2009 | Chan | | B60V 1/14 244/2 |
| 2011/0042507 A1 * | 2/2011 | Seiford, Sr. | | B60F 5/02 244/2 |
| 2013/0126666 A1 * | 5/2013 | Brown | | B60F 5/02 244/2 |
| 2014/0252165 A1 * | 9/2014 | Smith | | B64D 25/18 244/105 |
| 2014/0252166 A1 * | 9/2014 | Smith | | B64C 25/56 244/107 |
| 2016/0031275 A1 * | 2/2016 | Monroe | | B64C 39/024 244/2 |
| 2018/0156246 A1 * | 6/2018 | Bauer | | F15B 15/1457 |
| 2018/0170561 A1 * | 6/2018 | Daily, Jr. | | B64C 29/04 |
| 2018/0257772 A1 * | 9/2018 | Bernhardt | | B64C 35/00 |
| 2018/0312251 A1 * | 11/2018 | Petrov | | B64C 27/28 |
| 2019/0202570 A1 * | 7/2019 | Smith | | B64D 45/00 |

FOREIGN PATENT DOCUMENTS

| | | |
|---|---|---|
| CN | 106800089 A | 6/2017 |
| CN | 106882371 A | 6/2017 |
| CN | 107639984 A | 1/2018 |

\* cited by examiner

AIR, SEA AND UNDERWATER TILT TRI-ROTOR UAV CAPABLE OF PERFORMING VERTICAL TAKE-OFF AND LANDING

TECHNICAL FIELD

The present invention belongs to the technical field of unmanned aerial vehicles (UAVs) and unmanned underwater vehicles (UUVs), and particularly relates to an air, sea and underwater tilt tri-rotor UAV capable of performing vertical take-off and landing.

BACKGROUND

At present, UAVs are applied to more and more occasions, and the requirements for the performance and operation occasions of UAVs are higher and higher, for example, aerial photography, investigation, entertainment, transportation and the like. Because the operation scenarios of UAVs are diversified, for example, flat land, mountain land, underwater, water surface, sky and the like, the UAV capable of performing vertical take-off and landing has a lower requirement for taking-off and landing condition, but has relatively lower endurance time load; the fixed wing UAV has relatively high endurance time load, but has a high requirement for taking-off and landing condition; the unmanned surface vehicle can operate on water surface, to shoot surface environment, but cannot fly and has insufficient endurance; the unmanned underwater vehicle can operate underwater, to shoot underwater environment and hide underwater, but has insufficient endurance. The above four kinds of UAVs have obvious advantages and disadvantages respectively, and have limited application range and efficiency.

SUMMARY

The aim of the present invention is to provide an air, sea and underwater tilt tri-rotor UAV capable of performing vertical take-off and landing, by means of the method for controlling a submerged floating device and a tilt tri-rotor device, the UAV is switched among the vertical take-off and landing mode, the fixed wing mode, the water surface sailing mode and the underwater submerging mode, thereby making same have the advantages of four kinds of UAVs, and enhancing the applicability, maneuverability and efficiency of UAV.

The Present Invention Adopts the Following Technical Solution:

An air, sea and underwater tilt tri-rotor UAV capable of performing vertical take-off and landing, comprising a fuselage 1, a main wing 2, two ailerons 3, two vertical tails 4, two front tilt axes 5, two front tilt seats 6, two front motor rotors 7, a rear tilt seat 8, a rear motor rotor 9, a rear tilt axis 10, a propeller 11, two tail vanes 12, a right rear airbag 13, an airbag controller 14, a left rear airbag 15, an air cylinder 16, a front airbag 17 and a control panel, wherein the main wing 2 is of wing structure that is symmetrical with respect to the central axis and is integrated with the fuselage 1; the two ailerons 3 are of rectangular structure, are fixedly connected to the wing tails at both sides of the main wing 2 respectively, and may be unfolded to the direction of the fuselage 1 around the fixed end thereof; the two vertical tails 4 are symmetrically and perpendicularly fixed to the end upper surface of the main wing 2 by respectively taking the medial axis of the main wing 2 as an axis, and are located between the two ailerons 3;

the front motor rotors 7 are fixed to the front tilt seats 6, the front tilt, seats 6 are connected to the front part of the fuselage 1 by the front tilt axes 5, and the left part and the right part are symmetrical with respect to the medial axis of fuselage 1; the independent tilt angle of each of the front motor rotors 7 ranges from 0° to 100°;

the rear motor rotor 9 is fixed to the rear tilt seat 8, the rear tilt seat 8 is connected to the tail of the fuselage 1 by the rear tilt axis 10, and the tilt angle of the rear motor rotor 9 ranges from −30° to 30°; the rotational speeds of the two front motor rotors 7 and the rear motor rotor 9 are independently controlled, to achieve the vertical take-off and landing mode and the fixed wing mode;

the propeller 11 and the two tail vanes 12 pass through the lower part of the tail of the fuselage 1 and are connected to the control panel in the fuselage 1, the two tail vanes 12 are symmetrical with respect to the axis of symmetry of the fuselage 1, and the propeller 11 is located on the axis of symmetry of the two tail vanes 12; the two tail vanes 12 are controlled by the control panel to rotate and then the sailing direction is changed, and thus the sailing speed in water is changed by controlling the rotational speed of the propeller 11; and the right rear airbag 13, the airbag controller 14, the left rear airbag 15, the air cylinder 16 and the front airbag 17 are all fixed to, the fuselage 1 and the lower surface of the main wing 2, wherein the right rear airbag 13, the left rear airbag 15 and the front airbag 17 are arranged in an isosceles triangle, and the center of gravity of the air, sea, land and underwater tilt tri-rotor UAV is located on the line of symmetry of the isosceles triangle; and the right rear airbag 13, the left rear airbag 15 and the front airbag 17 are respectively connected to the air cylinder 16, and are controlled by the airbag controller 14.

The present invention has the advantageous effects that: the present invention has high efficiency in power system, has obviously improved endurance time and flight distance as compared with the traditional multi rotor UAV because of having the fixed wing mode; is applicable to more scenarios, and may operate on flat land, mountain land, water surface and underwater, thereby completing designated missions such as aerial, ground, water surface and underwater photography, survey and concealment.

DESCRIPTION OF DRAWINGS

FIG. 4 (b) is a schematic diagram of roll control in a vertical take-off and landing mode of the present invention.
FIG. 4 (c) is a schematic diagram of yaw control in a vertical take-off and landing mode of the present invention.

Figure 1:
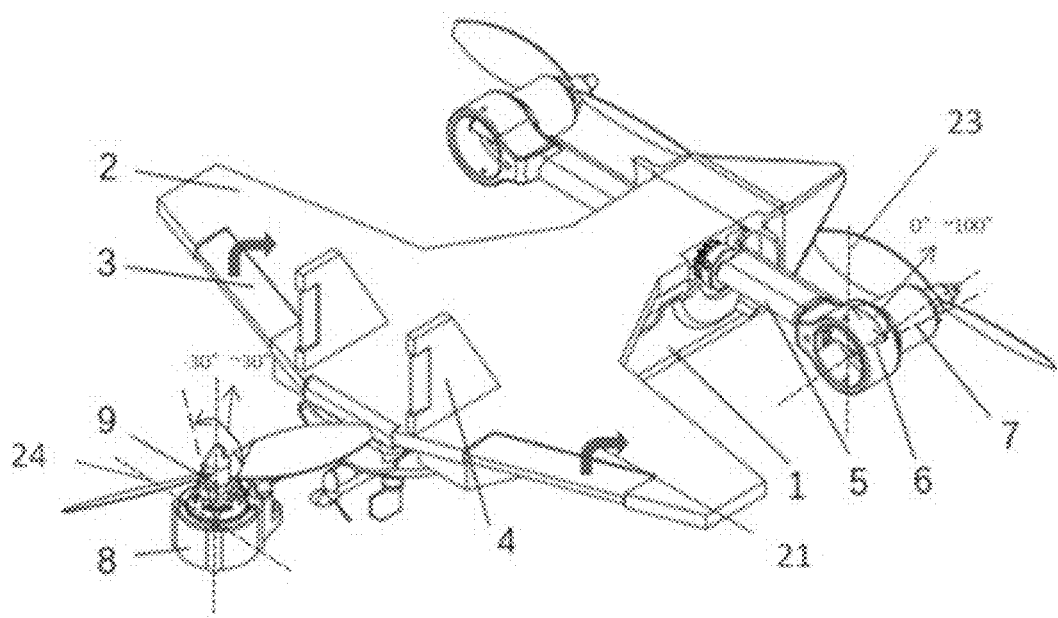
FIG. 1 is a top view of the present invention.

In the drawings: 1. Fuselage; 2. Main wing; 3. Aileron ×2; 4. Vertical tail ×2; 5. Tilt axis ×2; 6. Tilt seat ×2; 7. Motor rotor ×2; 8. Rear tilt seat; 9. Rear motor rotor; 10. Rear tilt axis; 11. Propeller; 12. Tail vane ×2; 13. Right rear airbag; 14. Airbag controller; 15. Left rear airbag; 16. Air cylinder; 17. Front airbag; 18 Control panel; 19 center of gravity of the UAV; 20 the line of symmetry of an isosceles triangle formed by the three airbags; 21 the ailerons fixedly connected to the wing tails at both sides of the main wing which may be unfolded to the direction of the fuselage around the fixed end thereof; 22 centrosymmetry of the airbags; 23 tilt angles for the front motors; 24 tilt angles for rear motors.

DETAILED DESCRIPTION

Specific embodiments of the present invention are described below in detail in combination with the technical solution and accompanying drawings.

Figure 2:
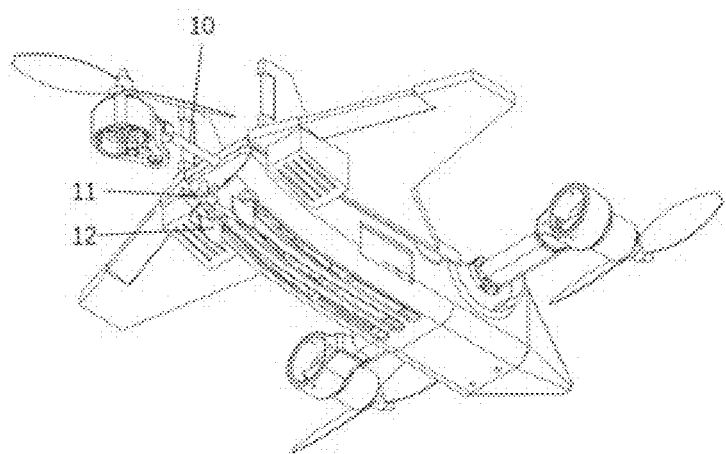
FIG. 2 is a side view of the present invention.
Figure 3:
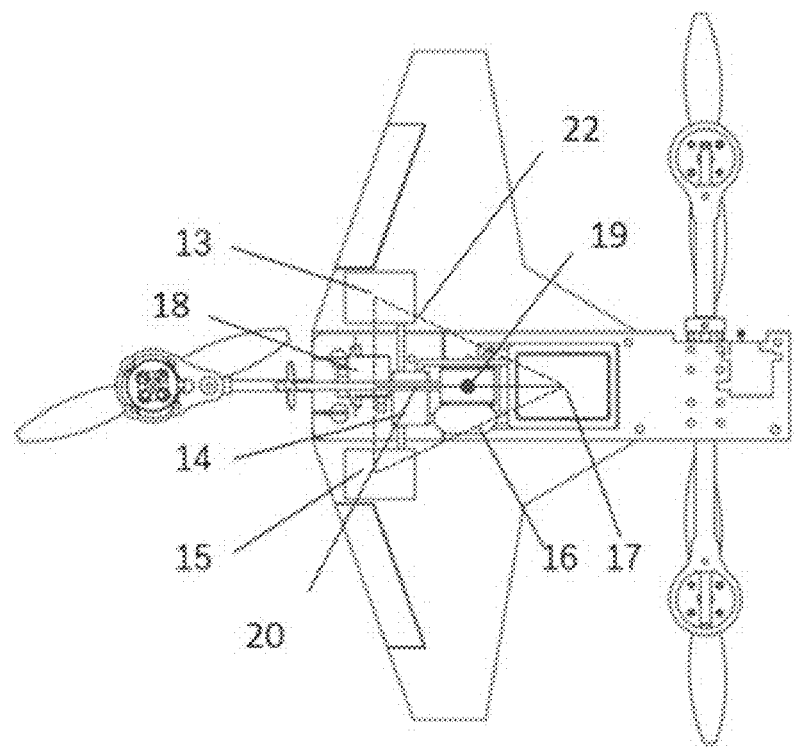
FIG. 3 is a bottom view of the present invention.
Figure 4A:
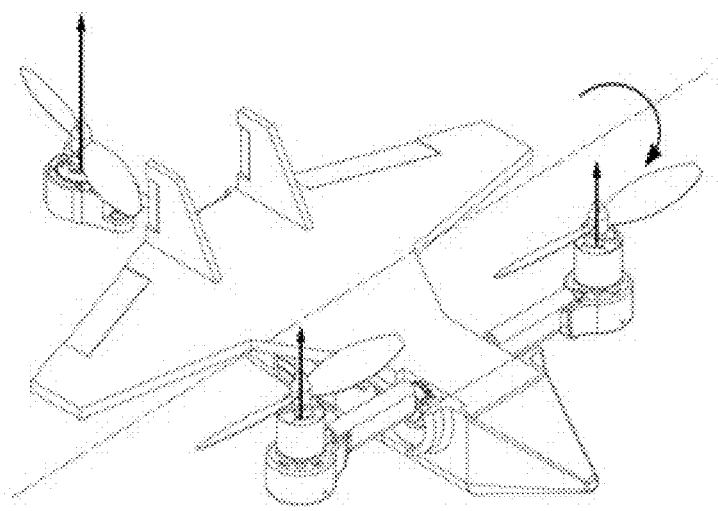
FIG. 4 (a) is a schematic diagram of control in a vertical take-off and landing mode of the present invention.
Figure 4B:
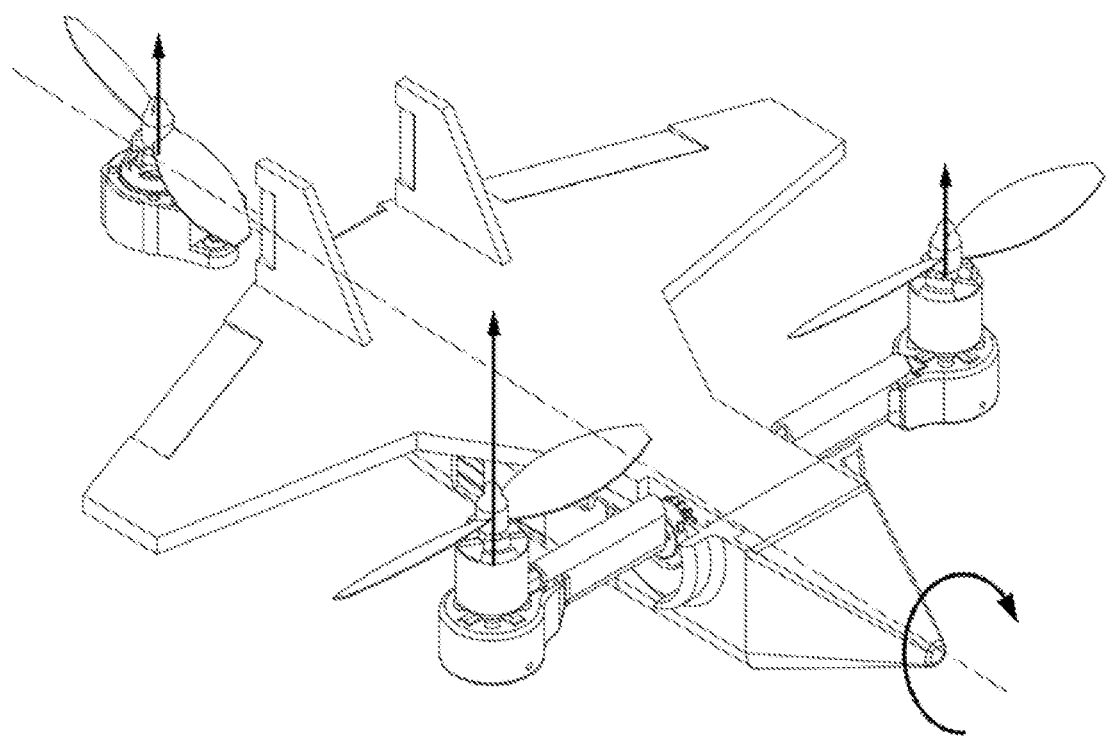
Figure 4C:
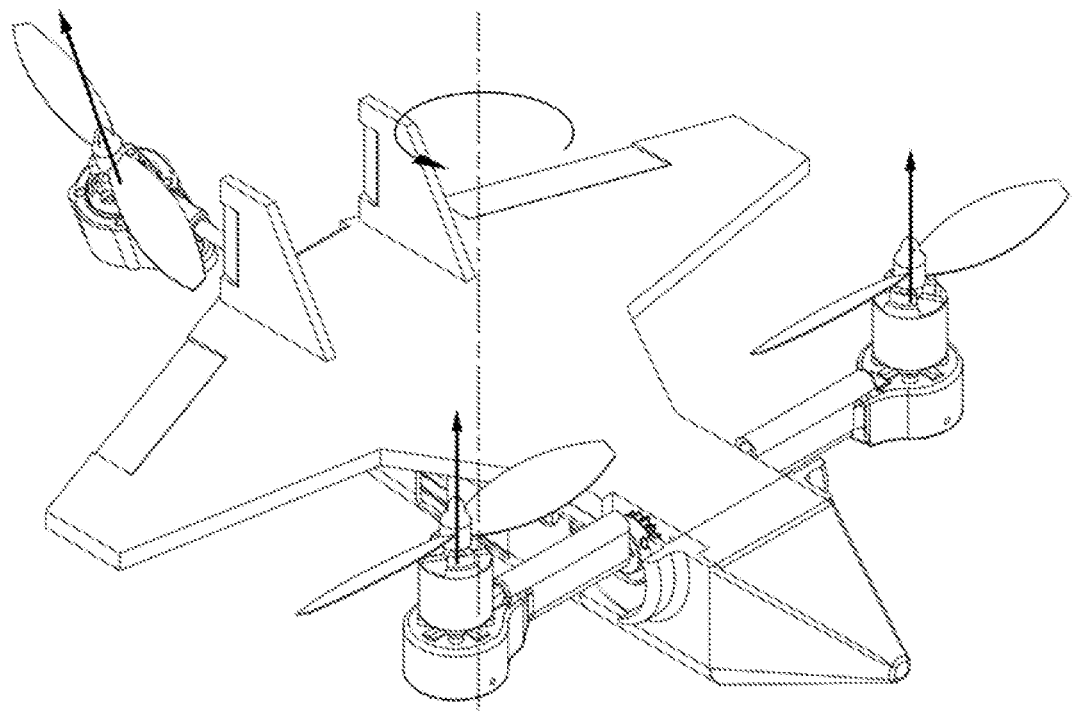
Figure 5:
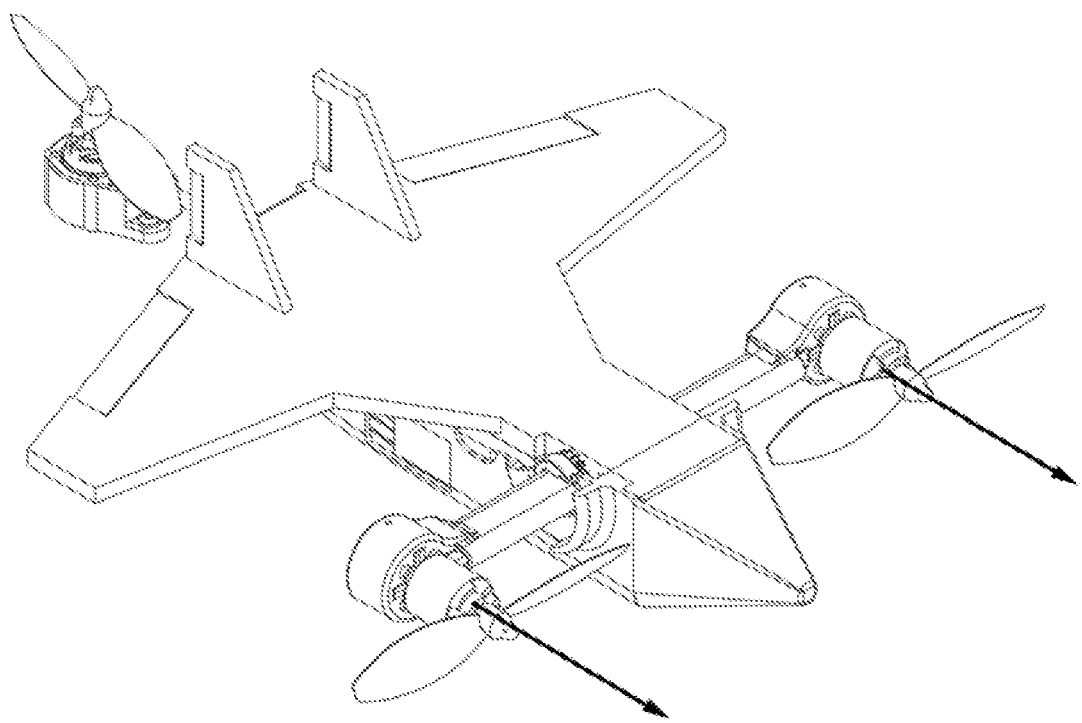
FIG. 5 is a schematic diagram of control in a fixed wing mode of the present invention.
Figure 6A:
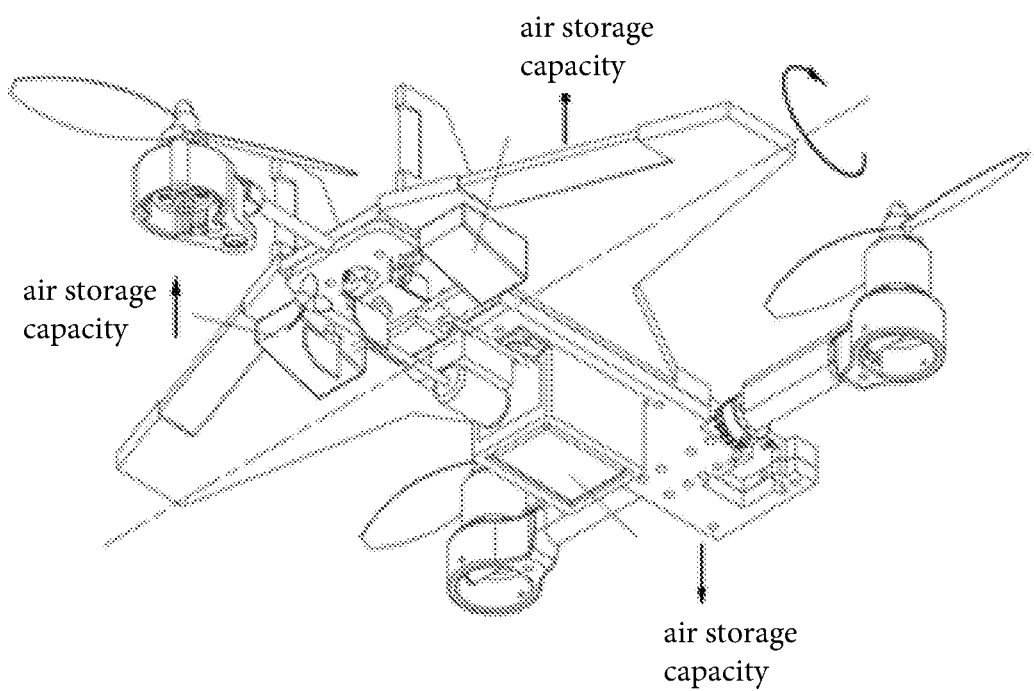
FIG. 6(a) is a schematic diagram of pitch control in an underwater mode.
Figure 6B:
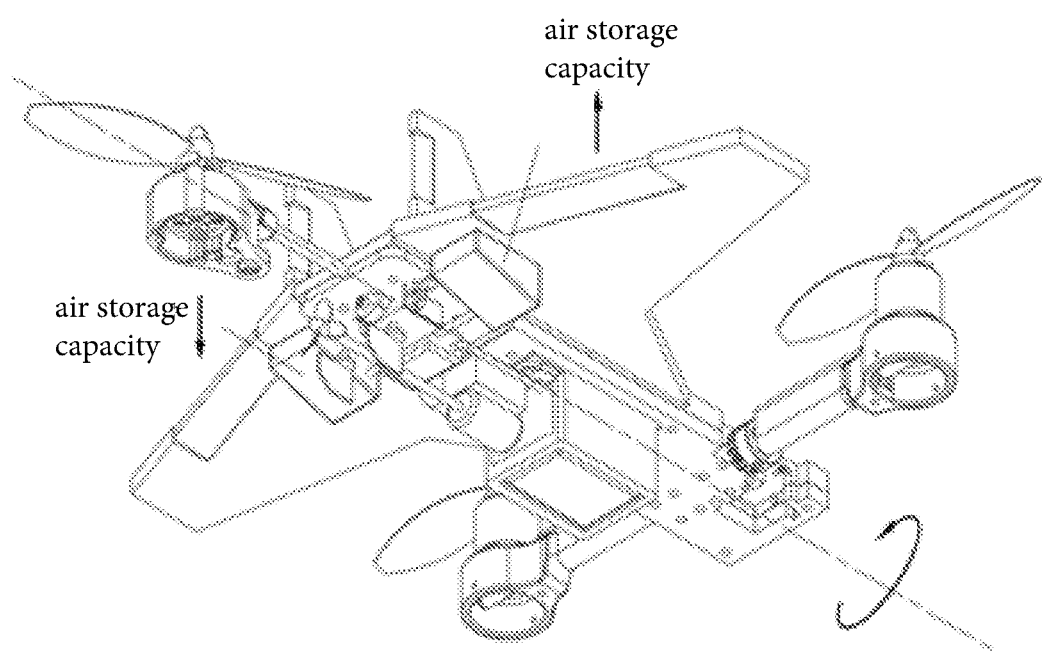
FIG. 6(b) is a schematic diagram of roll control in an underwater mode.

In combination with FIG. 1-FIG. 6b, an air, sea and underwater tilt tri-rotor UAV capable of performing vertical take-off and landing, comprising a fuselage 1, a main wing 2, two ailerons 3, two vertical tails 4, two front tilt axes 5, two front tilt seats 6, two front motor rotors 7, a rear tilt seat 8, a rear motor rotor 9, a rear tilt axis 10, a propeller 11, two tail vanes 12, a right rear airbag 13, an airbag controller 14, a left rear airbag 15, an air cylinder 16, a front airbag 17 and a control panel, wherein the main wing 2 is of wing structure that is symmetrical with respect to the central axis and is fixed to the upper surface of the fuselage 1; the two ailerons 3 are of rectangular structure, and are fixedly connected to the wing tails at both sides of the main wing 2 respectively; the two vertical tails 4 are symmetrically and perpendicularly fixed to the end upper surface of the main wing 2 by respectively taking the medial axis of the main wing 2 as an axis;

the front motor rotors 7 are fixed to the front tilt seats 6, the front tilt seats 6 are connected to the front part of the fuselage 1 by the front tilt axes 5, and the left part and the right part are symmetrical with respect to the medial axis of fuselage 1; the independent tilt angle of each of the left and right front motor rotors 7 ranges from 0° to 100°; the rear motor rotor 9 is fixed to the rear tilt seat 8, the rear tilt seat 8 is connected to the tail of the fuselage 1 by the rear tilt axis 10, and the tilt angle of the rear motor rotor 9 ranges from −30° to 30°; the rotational speeds of the three rotors are independently controlled, to achieve the vertical take-off and landing mode and the fixed wing mode;

the propeller 11 and the two tail vanes 12 pass through the lower part of the tail of the fuselage 1 and are connected to the control panel in the fuselage 1, the two tail vanes 12 are symmetrical with respect to the axis of symmetry of the fuselage 1, and the propeller 11 is located on the axis of symmetry of the two tail vanes 12; the two tail vanes 12 are controlled by the control panel to rotate and then the sailing direction is changed, and thus the sailing speed in water is changed by controlling the rotational speed of the propeller 11; and the airbag controller 14, the air cylinder 16 and the front airbag 17 are fixed to the control panel in the fuselage 1 from back to front in sequence, the right rear airbag 13, the left rear airbag 15, the air cylinder 16 and the front airbag 17 are connected to the airbag controller 14 respectively, wherein the right rear airbag 13 and the left rear airbag 15 are symmetrically fixed to the lower end of the wing tail of the main wing 2, and the air cylinder 16 fills air into the right rear airbag 13, the left rear airbag 15, the front airbag 17 through the airbag controller 14.

The Present Invention Includes Four Operation Modes in Total:

(1) Vertical Take-Off and Landing Mode:

In the vertical take-off and landing mode, when the two front motor rotors 7 and the rear motor rotor 9 of the UAV are vertically upward, the attitude control of the UAV may be achieved by simultaneously controlling the pushing force magnitude and direction of the two front motor rotors 7 and the rear motor rotor 9.

Pitch control: when the two front motor rotors 7 and the rear motor rotor 9 of the UAV are vertically upward, change in the pitch angle may be achieved by adjusting the difference between pulling forces of the front motor rotors 7 and the rear motor rotor 9; and the UAV may be made to pitch by simultaneously reducing the rotational speeds of the front motor rotors 7 or increasing the rotational speed of the rear motor rotor 9.

Roll control: when the two front motor rotors 7 and the rear motor rotor 9 of the UAV are vertically upward, the control of the roll angle may be achieved by adjusting the difference between pulling forces of the two front motor rotors 7 of the UAV; and the UAV may be made to roll by increasing the rotational speed of the front right motor rotor 7 or reducing the rotational speed of the front left motor rotor 7.

Yaw control: when the two front motor rotors 7 and the rear motor rotor 9 of the UAV are vertically upward, the control of the yaw angle may be achieved by adjusting the tilt angle of the rear tilt seat 8; and the UAV may be made to yaw by tilting the rear tilt seat 8 at a certain angle.

(2) Fixed Wing Flight Mode:

With the increase of the horizontal speed of the UAV, when the two front motor rotors 7 tilt to the horizontal position and the rear motor rotor 9 stops operating, the UAV may be completely controlled by the ailerons 3 and the vertical tails 4; and by controlling the pushing force magnitude of the two front motor rotors 7 and the control surface angle of the ailerons 3, the fixed wing flight mode may be achieved.

(3) Water Surface Sailing Mode:

The two front motor rotors 7 and the rear motor rotor 9 of the UAV stop operating, the air cylinder 16 fills the right rear airbag 13, the left rear airbag 15 and the front airbag 17 with air though the airbag controller 14 so that the UAV floats on the water surface, the tail vanes 12 rotate leftwards and rightwards to control the heading of the UAV, and the propeller 11 controls the advancing or withdrawing speed of the UAV.

(4) Underwater Sailing Mode:

The two front motor rotors 7 and the rear motor rotor 9 of the UAV stop operating, and the air cylinder 16 fills an appropriate amount of air into the right rear airbag 13, the left rear airbag 15 and the front airbag 17 through the airbag controller 14 to guarantee the underwater depth of the UAV.

Pitch control: the underwater pitch angle of the UAV may be controlled by controlling the difference between air storage capacities of the right rear airbag 13 and the left rear airbag 15, and the front airbag 17 by the airbag controller 14; and the UAV may be made to pitch by increasing the air storage capacity of the right rear airbag 13 and the air storage capacity of the left rear airbag 15 or reducing the air storage capacity of the front airbag 17.

Roll control: the underwater roll angle of the UAV may be controlled by controlling the difference between air storage capacities of the right rear airbag 13 and the left rear airbag 15 by the airbag controller 14; and the UAV may be made to roll by increasing the air storage capacity of the right rear airbag 13 or reducing the air storage capacity of the left rear airbag 15. The tail vanes 12 rotate leftwards and rightwards to control the heading of the UAV, and the propeller 11 controls the advancing or withdrawing speed of the UAV.

We claim:

1. An air, sea and underwater tilt tri-rotor unmanned air vehicle (UAV) capable of performing vertical take-off and landing, the air, sea and underwater tilt tri-rotor UAV comprising:
   a fuselage;
   a main wing;
   a front airbag;
   a right rear airbag;
   a left rear airbag;
   an air cylinder;
   an airbag controller;
   two ailerons;
   two vertical tails;
   two front tilt axes;
   two front tilt seats;
   two front motor rotors;
   a rear tilt axis;
   a rear tilt seat;
   a rear motor rotor;
   a propeller; and
   two tail vanes,
   wherein the right rear airbag, the left rear airbag, the front airbag, the air cylinder, and the airbag controller are all fixed to the fuselage and a lower surface of the main wing,
   wherein the right rear airbag, the left rear airbag and the front airbag are arranged in an isosceles triangle, and a center of gravity of the air, sea and underwater tilt tri-rotor UAV is located on a line of symmetry of the isosceles triangle; and the right rear airbag, the left rear airbag and the front airbag are respectively connected to the air cylinder, and are controlled by the airbag controller,
   wherein the main wing is symmetrical with respect to a longitudinal axis of the UAV and is integrated with the fuselage; the two ailerons are of rectangular structure and are connected along a trailing edge of the main wing at each side of the longitudinal axis; the two vertical tails are symmetrically and perpendicularly fixed to an upper surface of the main wing on each side of the longitudinal axis and located between the two ailerons,
   wherein the front motor rotors are fixed to the front tilt seats, the front tilt seats are connected to a front part of the fuselage by the front tilt axes, and are symmetrical with respect to the longitudinal axis,
   wherein the rear motor rotor is fixed to the rear tilt seat, the rear tilt seat is connected to a rear part of the fuselage by the rear tilt axis, rotational speeds of the two front motor rotors and the rear motor rotor are independently controlled, to achieve vertical take-off and landing mode and a fixed wing mode,
   wherein the propeller and the two tail vanes are connected to a lower part of the rear part of the fuselage, the two tail vanes are symmetrical with respect to the longitudinal axis, and the propeller is located on the longitudinal axis; and the two tail vanes are rotatable to change a sailing direction, and a rotational speed of the propeller is controlled to change a sailing speed in water, and
   wherein the air, sea and underwater tilt tri-rotor UAV includes four operation modes in total:
   (1) vertical take-off and landing mode:
   in a vertical take-off and landing mode, when the two front motor rotors and the rear motor rotor of the UAV are vertically upward, an attitude control of the UAV by simultaneously controlling a pushing force magnitude and direction of the two front motor rotors and the rear motor rotor;
   when the two front motor rotors and the rear motor rotor of the UAV are vertically upward, change in a pitch angle by adjusting the difference between pulling forces of the front motor rotors and the rear motor rotor; and the UAV is made to pitch by simultaneously reducing the rotational speeds of the front motor rotors or increasing the rotational speed of the rear motor rotor;
   when the two front motor rotors and the rear motor rotor of the UAV are vertically upward, control of a roll angle by adjusting difference between pulling forces of the two front motor rotors of the UAV; and the UAV is made to roll by increasing the rotational speed of the front right motor rotor or reducing the rotational speed of the front left motor rotor; and
   when the two front motor rotors and the rear motor rotor of the UAV are vertically upward, control of a yaw angle by adjusting the tilt angle of the rear tilt seat; and the UAV is made to yaw by tilting the rear motor rotor;
   (2) fixed wing flight mode:
   with increasing of a horizontal speed of the UAV, when the two front motor rotors tilt to a horizontal position and the rear motor rotor stops operating, the UAV is controlled by the ailerons and the vertical tails; and by controlling pushing force magnitude of the two front motor rotors and a control surface angle of the ailerons;
   (3) water surface sailing mode:
   the two front motor rotors and the rear motor rotor of the UAV stop operating, the air cylinder fills the right rear airbag, the left rear airbag and the front airbag with air though the airbag controller so that the UAV floats on the water surface, the tail vanes rotate leftwards and rightwards to control heading of the UAV, and the propeller controls advancing or withdrawing speed of the UAV; and
   (4) underwater sailing mode:
   the two front motor rotors and the rear motor rotor of the UAV stop operating, and the air cylinder fills an amount of air into the right rear airbag, the left rear airbag and the front airbag through the airbag controller to provide an underwater depth of the UAV;
   an underwater pitch angle of the UAV is controlled by controlling difference between air storage capacities of the right rear airbag and the left rear airbag, and the front airbag by the airbag controller; and the UAV is made to pitch by increasing the air storage capacity of the right rear airbag and the air storage capacity of the left rear airbag or by reducing the air storage capacity of the front airbag; and
   the underwater roll angle of the UAV is controlled by controlling a difference between air storage capacities of the right rear airbag and the left rear airbag by the airbag controller; the UAV is made to roll by increasing the air storage capacity of the right rear airbag or reducing the air storage capacity of the left rear airbag; and the tail vanes rotate leftwards and rightwards to control the heading of the UAV, and the propeller controls the advancing or withdrawing speed of the UAV.

* * * * *